United States Patent
Hachigian

(10) Patent No.: US 9,810,505 B2
(45) Date of Patent: Nov. 7, 2017

(54) SYSTEMS, APPARATUS AND METHODS THAT ALLOW THE FORCES FROM ELASTIC ELEMENTS TO CREATE INWARD FORCES ON A BASE OBJECT SUCH AS A SPEARGUN STOCK, AND ALSO REDUCE REARWARD FORCES

(71) Applicant: Garo Jack Hachigian, Encinitas, CA (US)

(72) Inventor: Garo Jack Hachigian, Encinitas, CA (US)

( * ) Notice: Subject to any disclaimer, the term of this patent is extended or adjusted under 35 U.S.C. 154(b) by 0 days.

(21) Appl. No.: 15/478,117

(22) Filed: Apr. 3, 2017

(65) Prior Publication Data
US 2017/0205184 A1    Jul. 20, 2017

Related U.S. Application Data

(63) Continuation of application No. 14/944,193, filed on Nov. 17, 2015, now Pat. No. 9,612,080.

(60) Provisional application No. 62/081,504, filed on Nov. 18, 2014.

(51) Int. Cl.
*F41B 7/04* (2006.01)
*A01K 81/00* (2006.01)

(52) U.S. Cl.
CPC .............. *F41B 7/04* (2013.01); *A01K 81/00* (2013.01)

(58) Field of Classification Search
CPC .................................. F41B 7/04; A01K 81/00
USPC ................................................. 124/20.3, 22
See application file for complete search history.

(56) References Cited

U.S. PATENT DOCUMENTS

| | | | | |
|---|---|---|---|---|
| 3,006,330 A | * | 10/1961 | De Bach | A01K 81/00 124/22 |
| 3,262,441 A | * | 7/1966 | Senne | A01K 81/00 124/22 |
| 3,340,642 A | * | 9/1967 | Vasiljevic | F41B 7/04 102/504 |
| 3,585,979 A | * | 6/1971 | Hendricks | F41B 7/04 124/22 |
| 3,741,190 A | * | 6/1973 | Lopez | A01K 81/00 124/22 |
| 4,193,386 A | * | 3/1980 | Rossi | F41B 7/04 124/22 |
| 4,318,389 A | * | 3/1982 | Kiss, Jr. | F41B 7/04 124/22 |
| 4,759,336 A | * | 7/1988 | Frain | F41A 17/22 124/22 |
| 4,894,940 A | * | 1/1990 | Frain | A01K 81/00 362/110 |
| 4,895,128 A | * | 1/1990 | Okada | A01K 81/00 124/22 |
| 4,962,747 A | * | 10/1990 | Biller | A01K 81/00 124/22 |

(Continued)

*Primary Examiner* — Alexander Niconovich
(74) *Attorney, Agent, or Firm* — Robert H Lee

(57) ABSTRACT

The current invention relates to systems, apparatus, and methods that allow the forces from elastic elements to create inward, rather than outward, forces on a base object such as a speargun base or stock. The invention discloses systems, apparatus, and methods for attaching elastic elements (also called bands or power bands) onto the stock in a manner that reduces or eliminates undesirable outward and rearward forces on that stock. While applicable in many contexts, the invention is particularly useful as a way to attach elastic bands to a speargun.

20 Claims, 12 Drawing Sheets

(56) References Cited

U.S. PATENT DOCUMENTS

| | | | | |
|---|---|---|---|---|
| 5,125,388 A * | 6/1992 | Nicely | ............... | F41B 3/02 |
| | | | | 124/20.1 |
| 5,372,118 A * | 12/1994 | Schmidt, III | ......... | A01K 81/00 |
| | | | | 124/20.3 |
| 5,524,603 A * | 6/1996 | Menzer | ............... | F41B 7/04 |
| | | | | 124/20.3 |
| 5,642,723 A * | 7/1997 | Hogan | ............... | F41B 3/005 |
| | | | | 124/20.3 |
| 5,904,132 A * | 5/1999 | Biller | ............... | F41B 7/04 |
| | | | | 12/34 |
| 5,931,145 A * | 8/1999 | Oviedo-Reyes | ......... | F41B 5/12 |
| | | | | 124/20.3 |
| 6,895,950 B2 * | 5/2005 | Gillet | ............... | F41B 7/04 |
| | | | | 124/20.3 |
| 7,926,474 B2 * | 4/2011 | Berry | ............... | F41B 7/04 |
| | | | | 124/20.3 |
| 8,312,869 B2 * | 11/2012 | Gillet | ............... | A01K 81/00 |
| | | | | 124/20.3 |
| 8,387,602 B1 * | 3/2013 | Bruington | ............... | F41B 7/04 |
| | | | | 124/20.3 |
| 9,243,864 B2 * | 1/2016 | Garofalo | ............... | F41B 11/73 |
| 9,255,764 B2 * | 2/2016 | Park | ............... | F41B 5/12 |
| 9,414,578 B2 * | 8/2016 | Thornbrough | ......... | A01K 81/06 |

* cited by examiner

SYSTEMS, APPARATUS AND METHODS THAT ALLOW THE FORCES FROM ELASTIC ELEMENTS TO CREATE INWARD FORCES ON A BASE OBJECT SUCH AS A SPEARGUN STOCK, AND ALSO REDUCE REARWARD FORCES

APPLICATION PRIORITY DATA

The current patent application is a continuation of U.S. patent application Ser. No. 14/944,193 filed on Nov. 17, 2015 by Hachigian, titled "SYSTEMS, APPARATUS AND METHODS THAT ALLOW THE FORCES FROM ELASTIC ELEMENTS TO CREATE INWARD FORCES ON A BASE OBJECT SUCH AS A SPEARGUN STOCK, AND ALSO REDUCE REARWARD FORCES" which claims priority to U.S. provisional patent application 62/081,504 filed on Nov. 18, 2014 by Hachigian, titled "SYSTEMS, APPARATUS, AND METHODS FOR ATTACHMENTS ONTO A BASE OBJECT THAT DIRECT FORCE INWARDS, SUCH AS ATTACHMENTS ON A SPEARGUN STOCK THAT DIRECT ELASTIC FORCE INWARD", which are incorporated by reference in their entirety.

FIELD OF THE INVENTION

The invention relates systems, apparatus, and methods for attaching elastic energy bands onto a base object in a manner that reduces or eliminates undesirable outward and rearward forces on that base object. While applicable in many contexts, the invention is particularly useful as a way to attach elastic power bands to a speargun.

BACKGROUND OF THE INVENTION

Spearguns are devices used to project spears (shafts) using pneumatic forces (not discussed in detail here) or elastic forces. The spears are typically made of a metal such as stainless steel. Typically a speargun is 30 cm to over a meter in length, and is made of materials such as metal, wood, plastic, carbon fiber, or some combination. Examples of spearguns in the prior art are illustrated in FIGS. 1 and 2.

A spear or shaft typically sits on top of the speargun. One or more elastic bands, often called power bands, are attached to the speargun near the front (also called the muzzle) of the speargun. Typically the band is a single piece, and this single band passes through a through a hole in the speargun (as illustrated in FIG. 1) or by directly attaching them to the top of the speargun near the front (as illustrated in FIG. 2), in which case there are two bands (or a pair of bands). Such bands are typically circular tubes made of latex or other elastic substance, and resemble surgical tubing or exercise bands.

The bands are stretched by the user and the ends of the bands are inserted onto the shaft using a notch or tab on the shaft (this process is called loading). The insertion is made by an object typically called a wishbone, which is attached to the end of the band or bands nearer the rear of the gun. In this state the stretched elastic bands store energy. When the shaft is released by releasing a trigger mechanism, the shaft is projected forward by the stored energy of the elastic bands. The shaft is projected forward of the speargun as the power bands quickly contract and release their energy. Typically the target of the shaft is a fish or some other prey that the user wishes to catch. The shaft is typically aimed by the user at a fish or other underwater object to strike and penetrate it.

In the prior art, when the band or bands are stretched (loaded), and the end opposite the base or stock is inserted onto the shaft using the wishbone, significant forces are created outward and rearward on the muzzle. Such forces can cause stress on the muzzle of the base or stock, which can cause it to crack, deform, or break. The force on the band or bands can also cause paint or other coating on the base or stock to delaminate. Thus, there is a need in the art for a manner of attaching power bands to the muzzle of the base or stock in a way that reduces or eliminates these forces.

SUMMARY OF THE INVENTION

The invention relates systems, apparatus, and methods for attaching elastic energy bands onto a base object in a manner that reduces or eliminates undesirable outward and rearward forces on that base object.

The invention includes but is not limited to an apparatus with: (a) a stock with a hole in it; (b) at least one elastic element with a attacher attached at or near a first end of the element; (c) a bracket; wherein (a) (b) and (c) are arranged so that the elastic element is on a first side of the stock, the attacher passes through the hole to a second, opposite side of the stock and around the bracket on the second side, so that when tension is placed on the elastic element, the elastic element via the attacher exerts force on the bracket inward toward the stock.

The apparatus can also include (d) a second elastic element with an attacher attached at or near a first end of the element, and (e) a second bracket, wherein (d) and (e) are arranged so that (d) is on the second, opposite side of the stock, and the loop passes through the hole to the first side and around the second bracket. The apparatus can also include wherein the first bracket and the second bracket are part of a same larger bracket. The apparatus can also include wherein the two elastic elements are connected to each other, on the ends opposite the two attachers, by an insertion element. The apparatus can also include wherein the insertion element is capable of being inserted on an object such as a projectile or spear. The apparatus can also include wherein the attacher is a loop, wherein the elastic element has a tubular shape, wherein the elastic element is made of rubber or latex. The apparatus can be a speargun or a permanent or temporary storage or housing structure.

The invention includes but is not limited to an apparatus with: a stock with a hole in it; a first elastic element with a first attacher attached at or near a first end of the element; a bracket; a second elastic element with a second attacher attached at or near a first end of the second element; wherein these are arranged so that the first elastic element is on a first side of the stock, the first attacher passes through the hole to a second, opposite side of the stock and around the rod on the second side, so that when tension is placed on the first elastic element, the elastic element via the attacher exerts force on the bracket inward toward the stock, and so that the second elastic element is on a second side of the stock, the second attacher passes through the hole to the first, opposite side of the stock and around the rod on the second side, so that when tension is placed on the second elastic element, the second elastic element via the attacher also exerts force on the bracket inward toward the stock.

The apparatus can also include wherein the apparatus has an additional pair of elastic elements in the same configuration as the first elastic element and the second elastic element. The apparatus can be a speargun or a permanent or temporary storage or housing structure.

The invention includes but is not limited to an apparatus with: a stock with a hole in it; a first elastic element with a first attacher attached to a first end of the element; a bracket; a second elastic element with a second attacher attached to a first end of the second element; and an insertion element that connects the two elastic elements on the non-attacher ends; wherein they are arranged so that the first elastic element is on a first side of the stock, the first attacher passes through the hole to a second, opposite side of the stock and around the rod on the second side and the second attacher passes through the hole to the first, opposite side of the stock and around the rod on the second. The apparatus can be a speargun or a permanent or temporary storage or housing structure. The apparatus can also include wherein the insertion element is capable of being inserted onto a shaft.

The invention includes but is not limited to an apparatus a stock having first and second side and a hole disposed through the stock from the first side to the second side; an elastic element having a first attacher secured to the elastic element proximate a first end of the elastic element and a second attacher secured to the elastic element proximate a second end of the elastic element, the first end of the elastic element disposed proximate the hole on the first side of the stock and the second end of the elastic element disposed proximate the hole on the second side of the stock; and a bracket including a first extension disposed along the first side of the stock proximate the hole and a second extension dispose along the second side of the stock proximate the hole, the elastic element secured to the stock using the hole and bracket such that: the first attacher extends through the hole from the first side of the stock to second side of the stock and engages the second bracket extension, and the second attacher extends through the hole from the second side of the stock to first side of the stock and engages the first bracket extension. The bracket can be a single continuous structure. The apparatus can also include wherein the first attacher is a loop configured for insertion of the second bracket extension. The apparatus can be a speargun or a permanent or temporary storage or housing structure. The apparatus can also include wherein the insertion element is capable of being inserted onto a shaft.

BRIEF DESCRIPTION OF THE DRAWINGS

The described techniques and mechanisms, together with other features, embodiments, and advantages of the present disclosure, may best be understood by reference to the following description taken in conjunction with the accompanying drawings, which illustrate various embodiments of the present techniques and mechanisms. In the drawings, structural elements having the same or similar functions are denoted by like reference numerals.

FIG. 1 also illustrates the front 105 and mid-section 109 of the speargun 100 and the base or stock 101.

FIG. 2 also illustrates the front 105 and mid-section 109 of the speargun 100 and the base or stock 101.

When a trigger mechanism of the speargun 100 is released, the shaft or spear 113 is projected forward by the stored energy of the FIG. 1 elastic 105. FIG. 3 also illustrates the front 105, top 111, and mid-section 109 of the speargun 100 and base or stock 101. It also illustrates the rear 117, which was not visible in FIGS. 1 and 2. Note that if the elastic 105 is attached to the front of the base or stock 101, passed through a hole in the front of the base or stock 101, that the elastic 105 will create an outward and rearward force on the front of the base or stock 101.

FIG. 4 also illustrates the front 105, top 111, and mid-section 109 of the speargun 100 and base or stock 101. It also illustrates the rear 117, which was not visible in FIGS. 1 and 2. Note that if the elastic 105 is attached to the front of the base or stock 101, passed through a hole in the front of the base or stock 101, that the elastic 105 will create an outward and rearward force on the front of the base or stock 101.

If one envisions the speargun base or stock 101 in between the two elastics 105, one can see that the force exerted by each elastic element will pull inward toward the speargun base or stock 101 rather than outward as in the prior art. This part of the invention will be discussed in more detail below. The invention will typically have at least two elastics 105 in a pair, one on each side of the speargun. The speargun of the invention may have more than one pair of elastics 105 to add more stored elastic energy to the speargun 100 apparatus.

Figure 7:
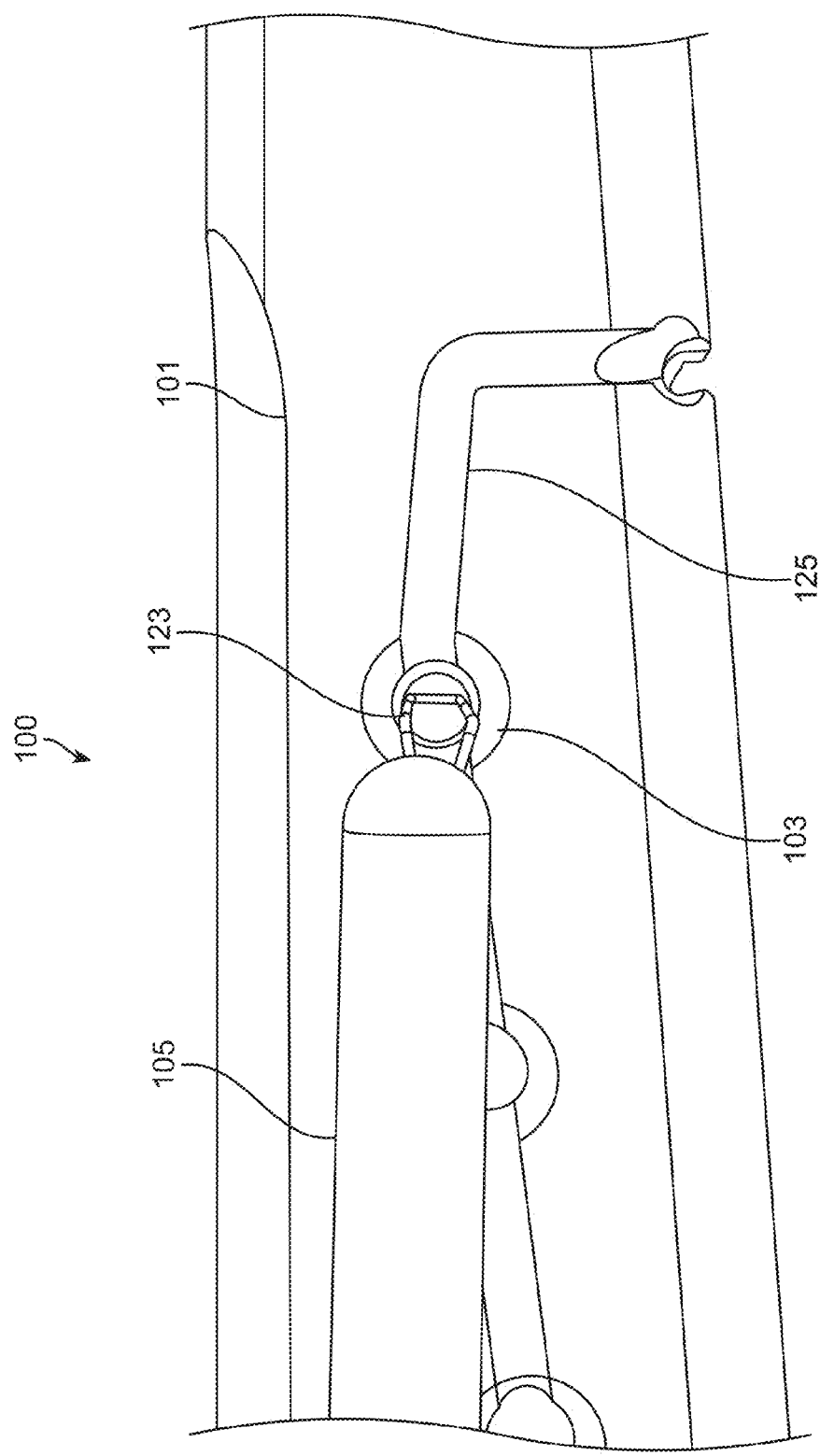

FIG. 7 is a close up view of an elastic 105 element shown in conjunction with the base or stock 101 of the speargun 100. It also shows an attacher 123 attached to the elastic 105 element and the attacher 123 passing through the hole 103 in the base or stock 101 so that it can loop around the bracket on the other side of the base or stock 101. Note again that, if one elastic 105 is pulled backward toward the rear 117 of the speargun, it will exert force on the part of the bracket 125 that is on the opposite side of the elastic 105.

Figure 8:
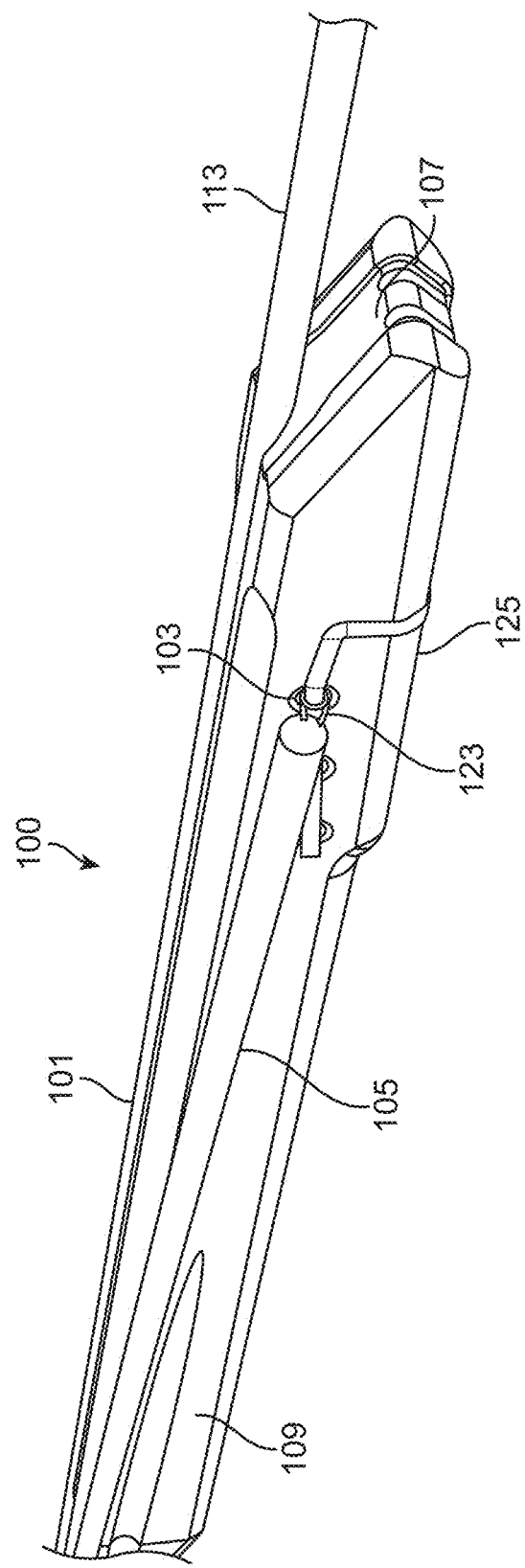

FIG. 8 is a wider view of the base or stock 101 of the speargun 100 of the invention. Here we can again see an attacher 123 attached to the elastic 105 element and the attacher 123 passing through the hole 103 in the base or stock 101 so that it can loop around the bracket 125 on the other side of the base or stock 101. Note again that, if one elastic 105 is pulled backward toward the rear 117 of the speargun, it will exert force on the part of the bracket 125 that is on the opposite side of the elastic 105. This view also illustrates the front 105, top 111, and mid-section 109 of the base or stock 101 of the speargun 100. It also illustrates the shaft or spear 113.

Figure 9:
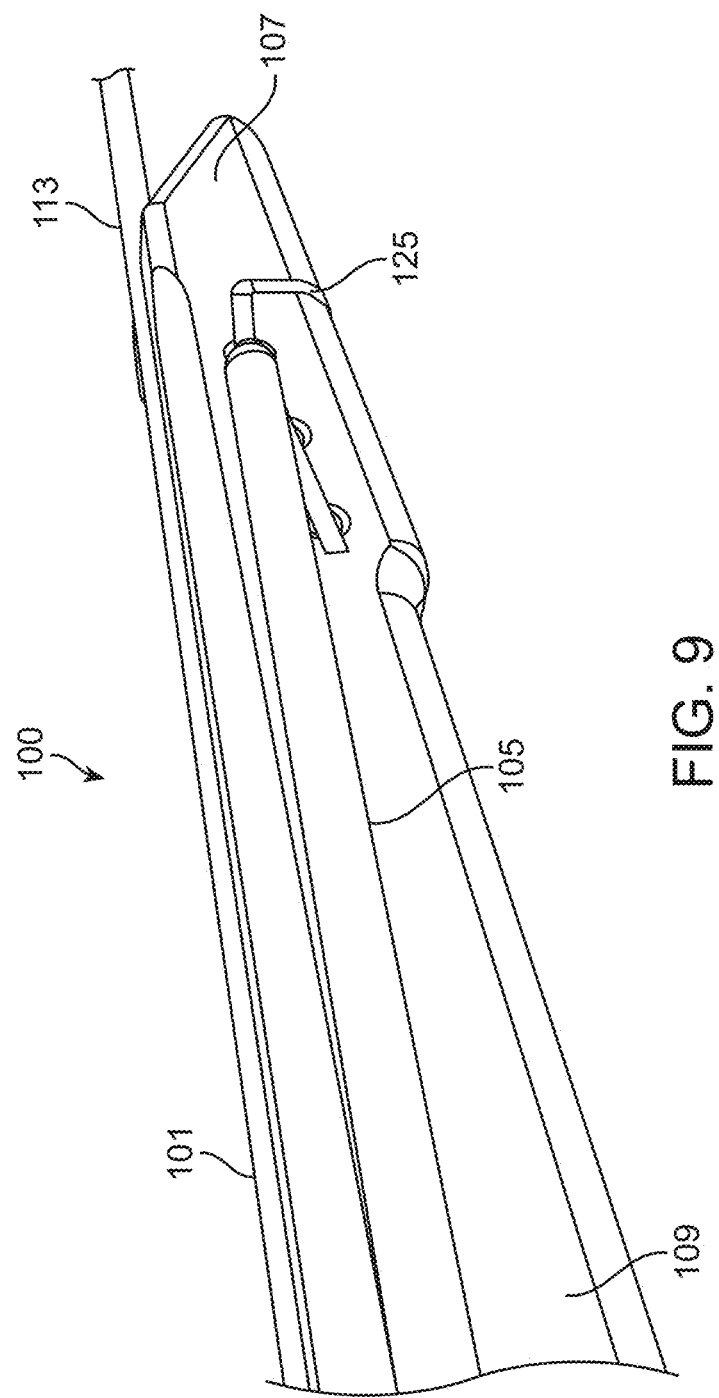

FIG. 9 is another view of the base or stock 101 of the speargun 100 of the invention. From this angle we can see the attacher 123 attached to the elastic 105 element but not the hole in the base or stock 101 through which the attacher 123 passes, so that the attacher 123 can loop around the bracket 125 on the other side of the base or stock 101. Note again that, if one elastic 105 is pulled backward toward the rear 117 of the speargun, it will exert force on the part of the bracket 125 that is on the opposite side of the elastic 105. This view also illustrates the front 105, top 111, and mid-section 109 of the base or stock 101 of the speargun 100. It also illustrates the shaft or spear 113.

Figure 10:
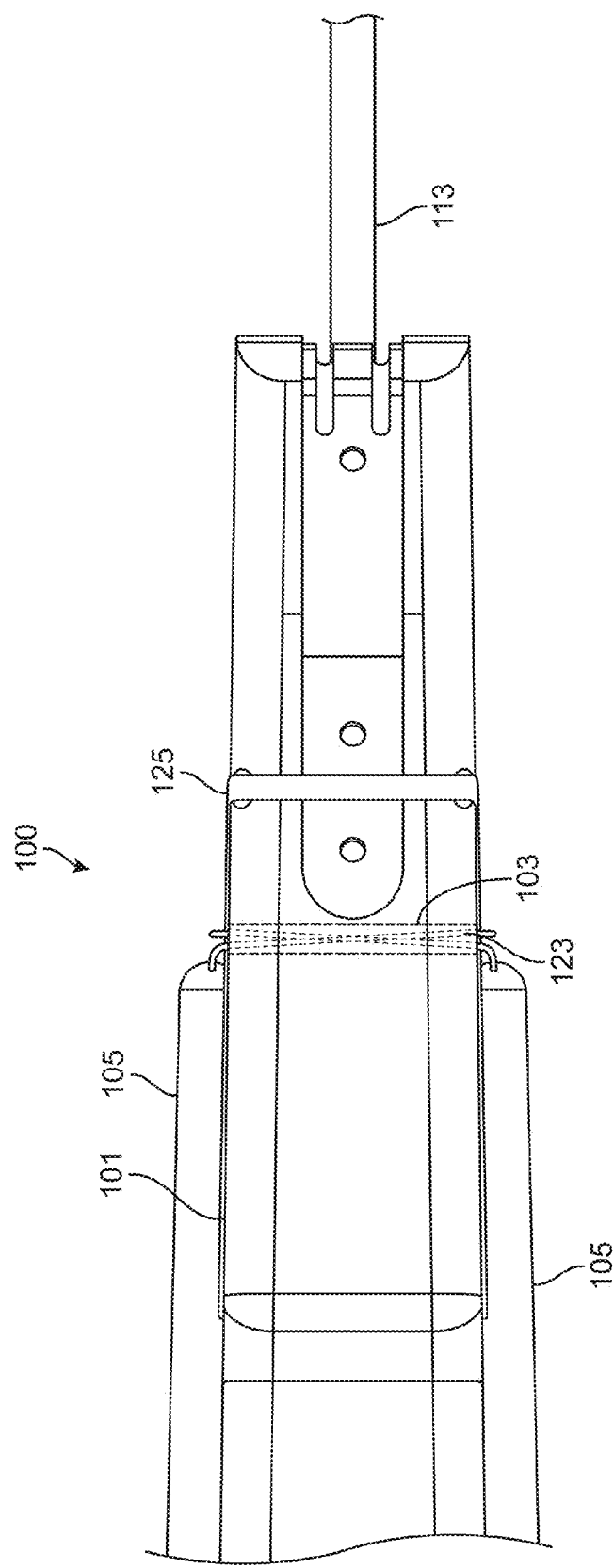

FIG. 10 is a bottom view of the base or stock 101 of the speargun 100 of the invention. It shows an elastic 105 element on each side of the base or stock 101 of the speargun 100. It also shows a attacher 123 attached to each elastic 105 element and the attacher 123 as a dotted line, passing through the hole 103 in the base or stock 101 so that it can loop around the bracket on the other side of the base or stock 101. It also illustrates the shaft or spear 113. Note again that, if one elastic 105 is pulled backward toward the rear 117 of the speargun, it will exert force on the part of the bracket 125 that is on the opposite side of the elastic 105.

Figure 11:
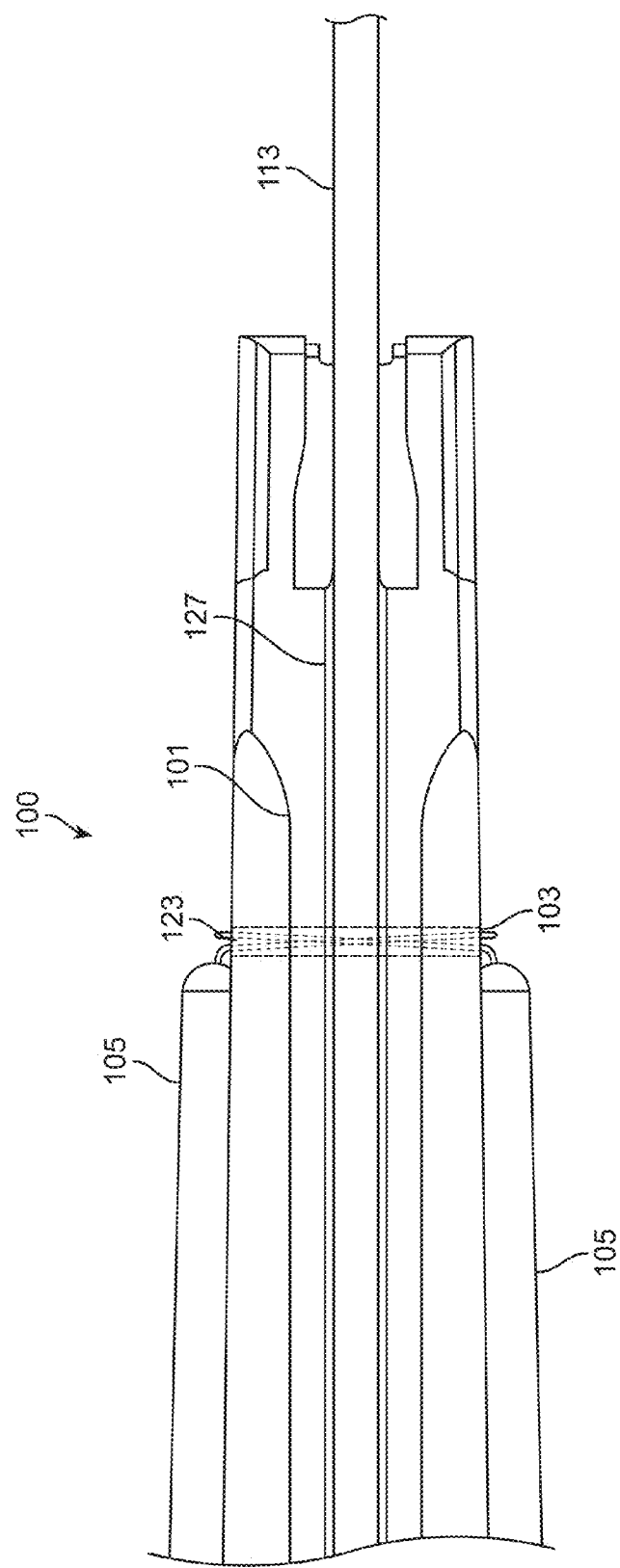

FIG. 11 is a top view of the base or stock 101 of the speargun 100 of the invention. It shows an elastic 105 element on each side of the base or stock 101 of the speargun 100. It also shows an attacher 123 attached to each elastic 105 element and the attacher 123 as a dotted line, passing through the hole 103 in the base or stock 101 so that it can loop around the bracket on the other side of the base or stock 101. Note again that, if one elastic 105 is pulled backward toward the rear 117 of the speargun, it will exert force on the part of the bracket 125 that is on the opposite side of the elastic 105. This close-up top view also shows the groove 127, in which the shaft or spear 113 sits on top of the base or stock 101.

Figure 12:
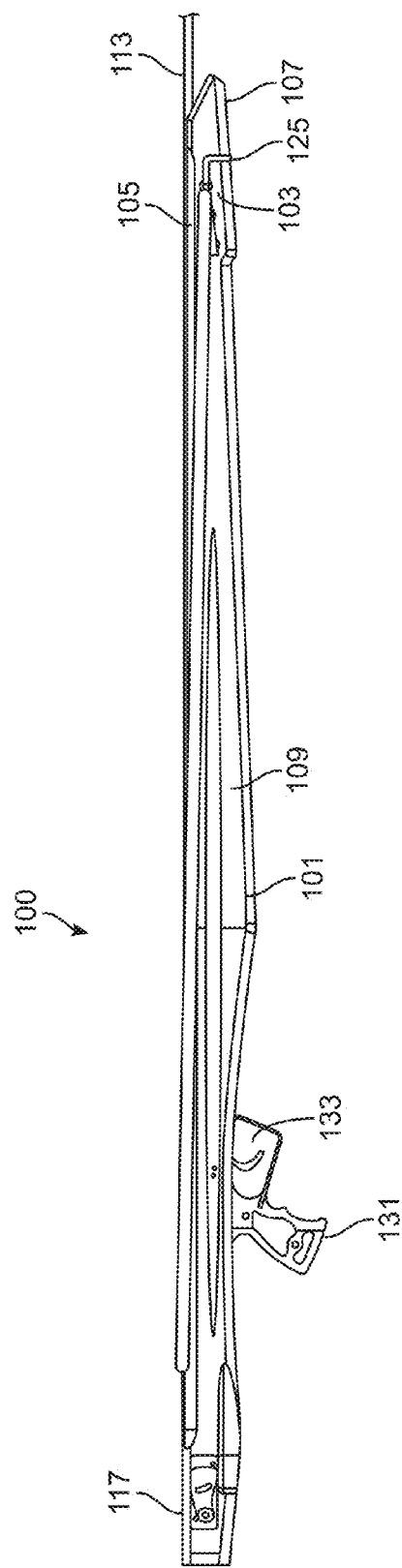

FIG. 12 illustrates, from a side view, the current invention in the context of the whole speargun 100. It includes a base or stock or stock 101, which is the stable part of the speargun 100 that the user holds and remains stable during use. A shaft or spear 113 typically sits in on top of the gun in a groove. The elastic 105 is typically inserted onto the shaft or spear 113 using a wishbone that inserts on a groove on the shaft or spear 113. When a trigger is released, the shaft or spear 113 is projected forward by the stored energy of the elastic 105. Also illustrated are the holes 103 that allow an attacher from the elastic 105, but not the elastic itself, to pass through the base or stock 101 to attach to a bracket (also not shown) on the opposite side. Also illustrated are the handle 131 and trigger 133, which are typically located near the center or toward the rear 117 of the speargun 100, and are similar to the handles and trigger of the prior art.

DETAILED DESCRIPTION OF THE INVENTION

The described techniques and mechanisms, together with other features, embodiments, and advantages of the present disclosure, may best be understood by reference to the following description taken in conjunction with the accompanying drawings, which illustrate various embodiments of the present techniques and mechanisms.

While discussed above and below, the following definitions are useful in understanding the invention.

The base or stock of a speargun is typically the largest portion of the speargun, and is the stable piece that remains relatively still even when the spear or shaft is released, The elastic bands contract and the spear or shaft is propelled forward. The base or stock is typically made of metal, wood, plastic, carbon fiber, or some combination.

The front portion of the base or stock is sometimes called a muzzle. This front portion or muzzle will typically have a hole, and the elastic element(s) will be threaded through the hole. In other cases the muzzle will have mechanisms for the elastic element(s) to be attached to.

These elastic elements are also called bands, elastics, or power bands that store potential energy that is imparted onto the spear or shaft. In the invention, the force of the elements is applied to the base or stock on the opposite side of the base or stock by passing an attacher (such as a loop) through a hole in the base or stock to the other side. The attacher will then be attached to an object such as a bracket, which will be pulled onto the base or stock when the elastic element is stretched (when the speargun is loaded).

While illustrated above as a single object, the bracket may in fact be two or more objects. The role of the bracket is simply as an attachment for the attacher of the elastic element, and any object or objects that suit this purpose can be called brackets. When the elastic element is stretched (when the speargun is loaded) the bracket may move slightly, or not at all, but the bracket will be pulled tight against the base or stock by the elastic element and the attacher on the other side.

While applicable in many contexts, the invention is particularly useful as a way to attach an elastic power band or bands to a speargun. The invention is applicable to any apparatus where it useful to mitigate undesirable forces. For instance, in a speargun apparatus of the prior art, the forces caused by the elastic band are outward and rearward. The invention converts the outward forces into inward forces, by connecting the elastic elements to the bracket on the opposite side of the speargun via the attachers.

The invention also significantly reduces the maximal rearward force placed on the base or stock by the elastic element in an embodiment wherein the attacher of an elastic element is also looped around the bracket on the same side of the base or stock, thus allowing the bracket on that side to take on some of the rearward forces. Further, in spearguns of the prior art, when the elastic element is stretched, most of the rearward force component is placed on one point between the elastic element and the base or stock. In the current invention, this rearward force component is distributed more evenly along the width of the hole in the base or stock.

The invention is easily adapted and implemented to many such situations. In addition, since the invention easily and effectively creates inward forces on the base object, the invention can be used in a situation where elastic stored energy is not needed for some separate purpose, but where it is desirable to add inward force on the base object to increase its effective stability or strength. For example, in a building structure or temporary housing or a storage unit structure, it may be desirable to increase the strength or stability of a support column or other element in the structure. By pairing elastic elements on either side of the structure, and passing the force of the elastic elements through the support column or other structure, the effective stability or strength of the structure can be increased. This is particularly useful when it is desirable to implement relatively lightweight structures on a rapid basis.

Figure 1:
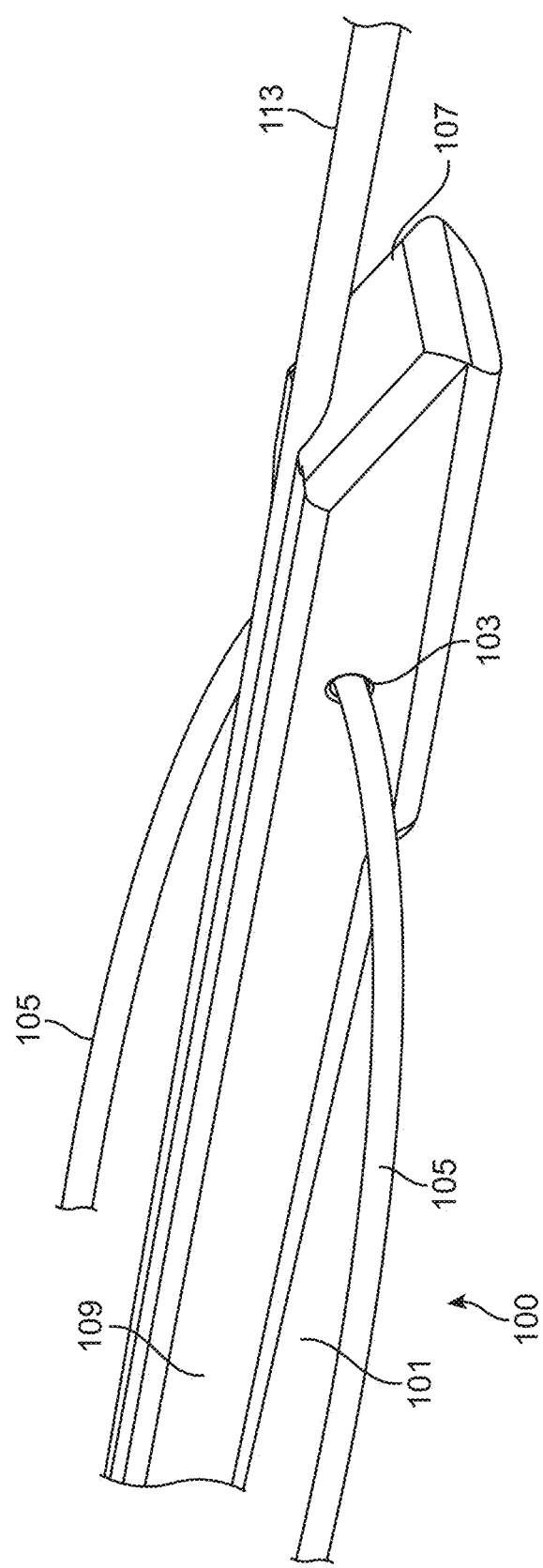
FIG. 1 (prior art) illustrates a view of a speargun 100 in the prior art. It includes a base or stock or stock 101, which is typically made of metal, wood, plastic, carbon fiber, or some combination, and is the stable part of the speargun 100 that the user holds and remains stable during use. The speargun 100 will typically have a hole 103 that allows an elastic 105 to pass through the base or stock 101. A shaft or spear 113 typically sits in on top of the gun in a groove. The elastic 105 is typically inserted onto the shaft or spear 113 using an insertion element that inserts on a groove on the shaft or spear 113. When a trigger is released, the shaft or spear 113 is projected forward by the stored energy of the elastic 105.
Figure 2:
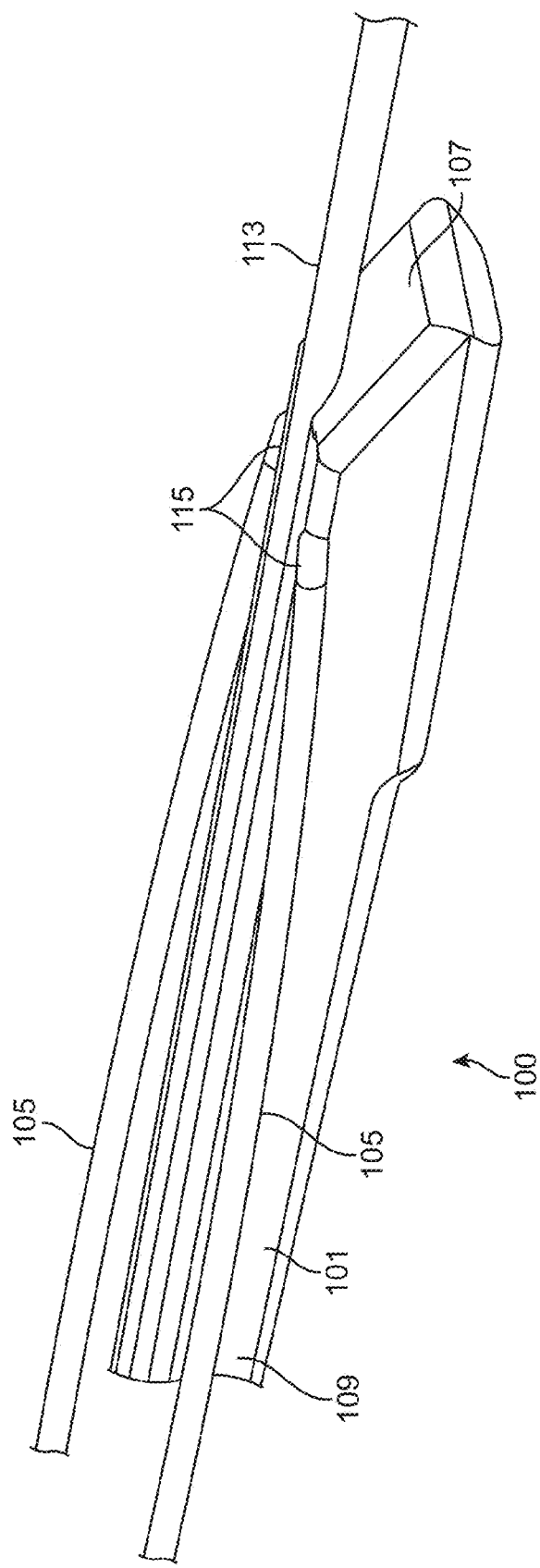
FIG. 2 (prior art) illustrates a view of another speargun 100 in the prior art. The arrangement is quite similar to the speargun illustrated in FIG. 1, including a base or stock or stock 101. This speargun 100 does not have a hole 103 (or if it has a hole it is not utilized). Instead the elastic 105 is in two pieces, and the front of each piece of the elastic is attached to the base or stock 101 by an attachment 115 element on the top or front of the base or stock 101. Often each elastic 105 will have a male screw element that will screw into the attachment 115. When a trigger is released, the shaft or spear 113 is projected forward by the stored energy of the elastic 105.

FIGS. 1 and 2, as described above, illustrate the prior art with respect to spearguns and how their elastic components are attached to the base or stock 101 of the speargun 100.

Figure 3:
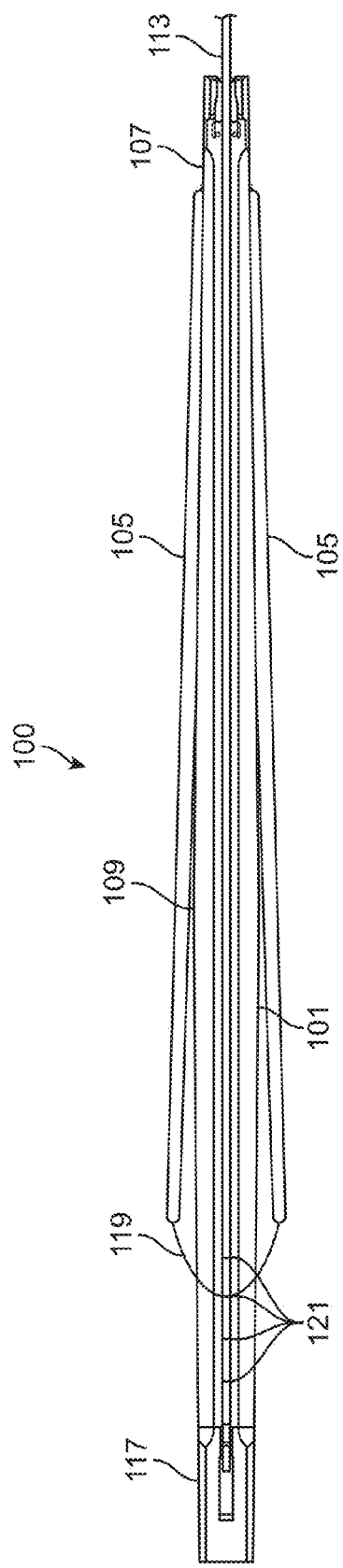
FIG. 3 illustrates a top view of a speargun 100 that is generalized enough to describe both spearguns of the prior art and the one of the current invention. It includes a base or stock or stock 101, the elastic 105, which in the prior art passes through the hole as described above, or attaches to the front or top of the base or stock 101. The figure also illustrates an insertion element or wishbone 119, which is attached to the elastic and allows the elastic to be inserted onto the shaft or spear 113 using a notch or tab 121 on the shaft or spear 113. The insertion element or wishbone 119 is typically made of metal, wire, or string.
Figure 4:
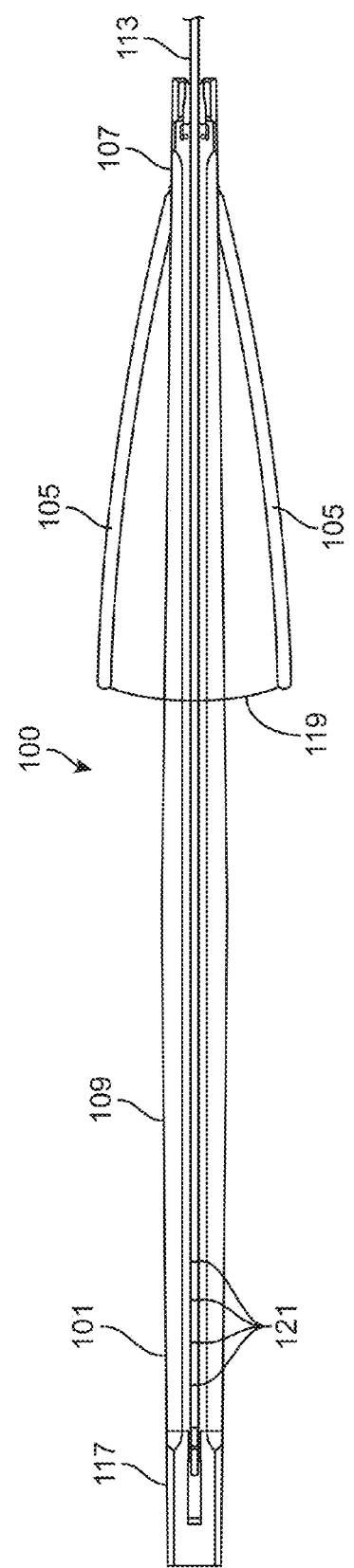
FIG. 4 illustrates the same speargun 100 with all the same elements as FIG. 3, but with the elastic 105 not inserted on the shaft or spear 113 but instead hanging loose. Hence the elastic 105 in this state is shorter, with no energy stored in it. The figure includes base or stock or stock 101, the elastic 105, which in the prior art passes through the hole as described above, or attaches to the front or top of the base or stock 101. The figure also illustrates an insertion element or wishbone 119, which is attached to the elastic and allows the elastic to be inserted onto the shaft or spear 113 using a notch or tab 121 on the shaft or spear 113.

FIGS. 3 and 4, as described above, illustrate views of a speargun 100 that are generalized enough to describe both spearguns of the prior art and the one of the current invention, in that the manner in which the end of the elastic or elastics 105 are constructed and attached to the bracket 125 are not visible, and the bracket itself is not visible.

Figure 5:
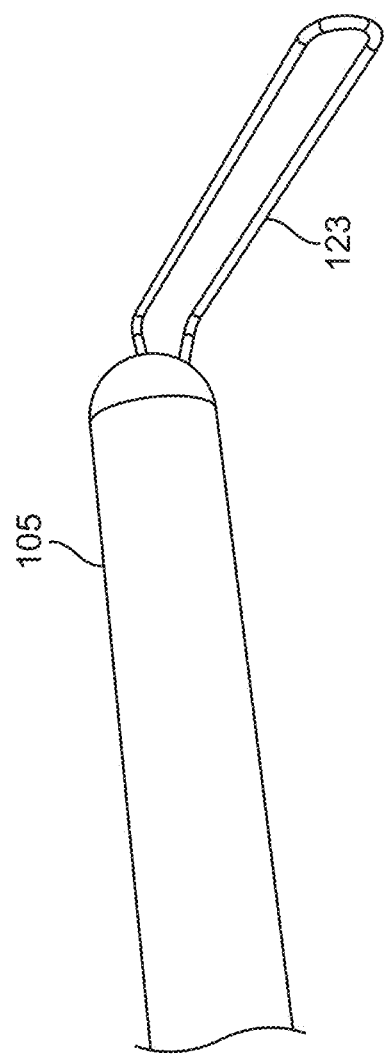
FIG. 5 is a close up view of an elastic 105 element. It also shows an attacher 123 attached to the elastic 105 element that allows it to be attached to another object, as part of the invention. The invention will typically have at least two elastic 105 elements, one on each side of the speargun. The speargun of the invention may have more than one pair of elastics 105 to add more stored elastic energy to the speargun apparatus. In a preferred embodiment, the attacher 123 is a loop.

FIG. 5 is a close up view of an elastic 105 element. It also shows an attacher 123 attached to the elastic 105 element that allows it to be attached to another object, as part of the invention. The invention will typically have at least two elastic 105 elements, one on each side of the speargun. The speargun of the invention may have more than one pair of elastics 105 to add more stored elastic energy to the speargun apparatus. In a preferred embodiment, the attacher 123 is a loop, and can be made of most any material that is sufficiently strong to withstand the forces involved, such as metal wire, nylon, plastic, or string.

In other embodiments, the attacher 123 is not a loop, but some other element that allows for attachment, and also be made of various materials.

Figure 6:
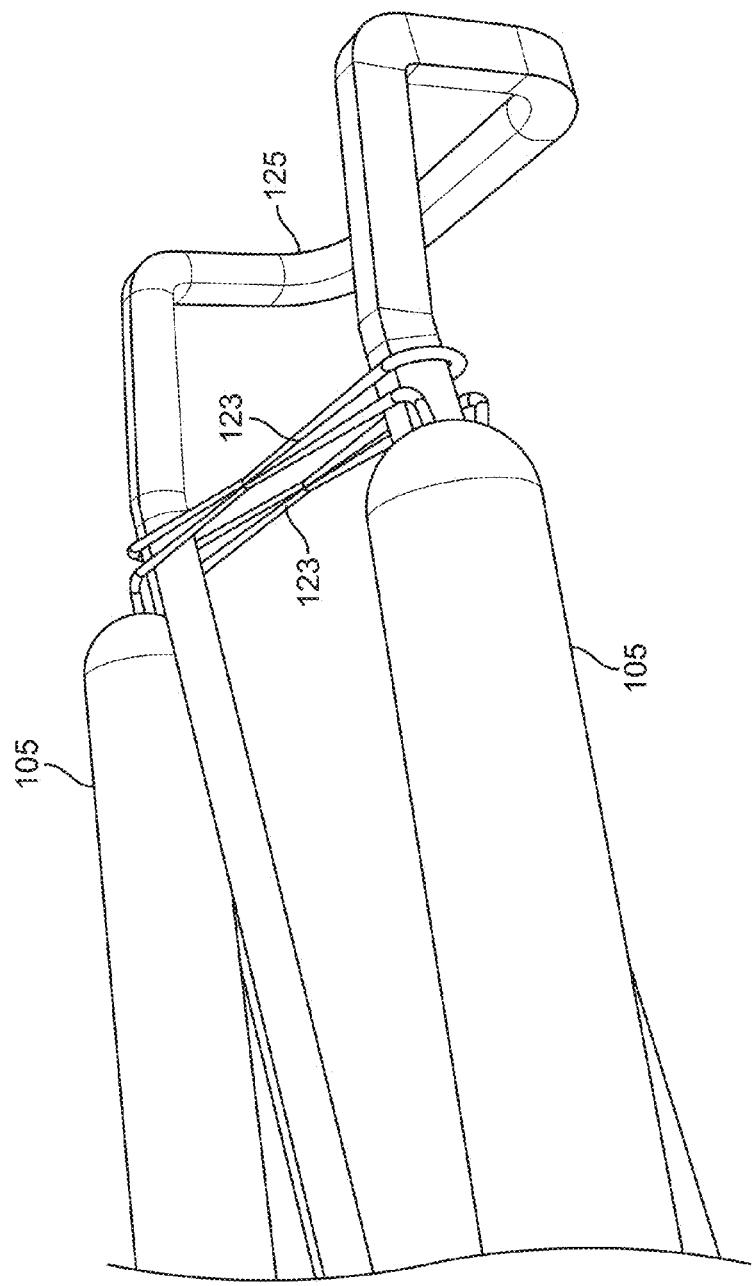
FIG. 6 is a close up view of two elastic 105 elements, which are paired on either side of the speargun for symmetry. It also shows the attacher 123 attached to each elastic 105 element as well as a bracket 125. Note that the attacher 123 of each elastic 105 is looped around the bracket 125 on the opposite side of the elastic 105. Therefore, if one elastic 105 is pulled backward toward the rear of the speargun, it will exert force on the part of the bracket 125 that is on the opposite side of the elastic 105. Note that the bracket 125 can have a different shape than shown, or can be composed of two or more separate pieces/elements.

FIG. 6 is a close up view of two elastic 105 elements, which are paired on either side of the speargun for symmetry. It also shows the attacher 123 attached to each elastic 105 element as well as a bracket 125. Note that the attacher 123 of each elastic 105 is looped around the bracket 125 on the opposite side of the elastic 105. Therefore, if one elastic 105 is pulled backward toward the rear of the speargun, it will exert force on the part of the bracket 125 that is on the opposite side of the elastic 105. Note that the bracket can have a different shape than shown, and can be in more than one piece, in other words, each attacher 123 could attach to a different bracket 125. The bracket could also be intrinsically part of the base or stock 101, in other words, not a separate object 125. For instance, the bracket could be a projection or slot in the base or stock 101 to which the attacher 123 can attach.

If one envisions the speargun base or stock 101 in between the two elastics 105, one can see that the force exerted by each elastic element will pull inward toward the speargun base or stock 101 rather than outward as in the prior art. The invention will typically have at least two elastics 105 in a pair, one on each side of the speargun. The speargun of the invention may have more than one pair of elastics 105 to impart more stored elastic energy to the speargun 100 apparatus.

FIG. 7 is a close up view of an elastic 105 element shown in conjunction with the base or stock 101 of the speargun 100. It also shows an attacher 123 attached to the elastic 105 element and the attacher 123 passing through the hole 103 in the base or stock 101 so that it can loop around the bracket on the other side of the base or stock 101. Note again that, if one elastic 105 is pulled backward toward the rear 117 of the speargun, it will exert force on the part of the bracket 125 that is on the opposite side of the elastic 105. Note, in a preferred embodiment, as illustrated, the loop from the elastic 105 on one side also loop around the bracket 125 on the same side as the elastic 105 before going through the hole (not shown here) and looping around the bracket 125 on the other side. This is useful because when the elastics 105 are stretched, and thus exert force, much of the inward force is taken up by the bracket 125 rather than the base or stock 101. In addition, some of the rearward force of the elastics 105 are also taken up by the bracket 125. Thus, in this embodiment, both outward and rearward forces on the base or stock 101 are reduced.

Further, in spearguns of the prior art, when the elastic element is stretched, most of the rearward force component is placed on one point between the elastic element and the base or stock. In the current invention, this rearward force component is distributed more evenly along the width of the hole in the base or stock.

FIG. 8 is a wider view of the base or stock 101 of the speargun 100 of the invention. Here we can again see an attacher 123 attached to the elastic 105 element and the attacher 123 passing through the hole 103 in the base or stock 101 so that it can loop around the bracket 125 on the other side of the base or stock 101. Note again that, if one elastic 105 is pulled backward toward the rear 117 of the speargun, it will exert force on the part of the bracket 125 that is on the opposite side of the elastic 105. This view also illustrates the front 105, top 111, and mid-section 109 of the base or stock 101 of the speargun 100. It also illustrates the shaft or spear 113.

FIG. 9 is another view of the base or stock 101 of the speargun 100 of the invention. From this angle we can see the attacher 123 attached to the elastic 105 element but not the hole in the base or stock 101 through which the attacher 123 passes, so that the attacher 123 can loop around the bracket 125 on the other side of the base or stock 101. Note again that, if one elastic 105 is pulled backward toward the rear 117 of the speargun, it will exert force on the part of the bracket 125 that is on the opposite side of the elastic 105. This view also illustrates the front 105, top 111, and mid-section 109 of the base or stock 101 of the speargun 100. It also illustrates the shaft or spear 113.

FIG. 10 is a bottom view of the base or stock 101 of the speargun 100 of the invention. It shows an elastic 105 element on each side of the base or stock 101 of the speargun 100. It also shows a attacher 123 attached to each elastic 105 element and the attacher 123 as a dotted line, passing through the hole 103 in the base or stock 101 so that it can loop around the bracket on the other side of the base or stock 101. It also illustrates the shaft or spear 113. Note again that, if one elastic 105 is pulled backward toward the rear 117 of the speargun, it will exert force on the part of the bracket 125 that is on the opposite side of the elastic 105.

FIG. 11 is a top view of the base or stock 101 of the speargun 100 of the invention. It shows an elastic 105 element on each side of the base or stock 101 of the speargun 100. It also shows an attacher 123 attached to each elastic 105 element and the attacher 123 as a dotted line, passing through the hole 103 in the base or stock 101 so that it can loop around the bracket on the other side of the base or stock 101. Note again that, if one elastic 105 is pulled backward toward the rear 117 of the speargun, it will exert force on the part of the bracket 125 that is on the opposite side of the elastic 105. This close-up top view also shows the groove 127, in which the shaft or spear 113 sits on top of the base or stock 101.

FIG. 12 illustrates, from a side view, the current invention in the context of the whole speargun 100. It includes a base or stock or stock 101, which is the stable part of the speargun 100 that the user holds and remains stable during use. A shaft or spear 113 typically sits in on top of the gun in a groove. The elastic 105 is typically inserted onto the shaft or spear 113 using a wishbone that inserts on a groove on the shaft or spear 113. When a trigger is released, the shaft or spear 113 is projected forward by the stored energy of the elastic 105. Also illustrated are the holes 103 that allow an attacher from the elastic 105, but not the elastic itself, to pass through the base or stock 101 to attach to a bracket (also not shown) on the opposite side. Also illustrated are the handle 131 and trigger 133, which are typically located near the center or toward the rear 117 of the speargun 100, and are similar to the handles and trigger of the prior art.

The front end of the speargun (often called a muzzle) is where the elastic 105 elements, often called power bands, are attached to the base or stock 101 so they can be pulled back toward the back of the gun by the operator/user to load the speargun. These elastic 105 elements are typically long thin tubes, similar to surgical tubing, and surgical tubing can actually be used as the elastic 105 elements. The elastic 105 elements may be made of rubber, latex, or some other substance that allows for storing of elastic energy. As illustrated in various figures, the elastic 105 elements are typically tubular in shape, and much longer in one dimension than the other two.

The muzzle refers to the front portion of the base or stock 101. In the current art, muzzles either have one or more power bands attached directly to the stock, or have holes in the stock to allow one or more power bands to be passed through them. Designs in the current art actively weaken the base or stock 101 muzzle by putting undue outward and rearward pressure on the stock by the elastic 105 elements. If the hole where the elastic 105 elements pass is in the center of the base or stock 101 (center with respect to the up and down axis of the base or stock 101), then at least the elastic 105 elements will not cause forces outside of this axis. However, in the case where the elastic 105 elements way from the center, towards the top or the bottom, then additional forces will be created along this axis.

Thus the invention as described allows each elastic 105 element, when stretched/loaded by the user, to pull from the opposite side of the stock on the bracket 125 it is attached to, thus creating an inward directed force. This is in stark contrast to the forces that are created by attachments in the current art, where the power bands pull outward and place high rearward forces on the muzzle. In the current invention, the force is inward, thus increasing the effective strength of the muzzle during loading. And in fact, the more power bands that are loaded, the more reinforcement will be created. The muzzle can thus be thought of as a self-reinforcing muzzle, in that loading the speargun makes the muzzle stronger.

While a preferred embodiment has been described where elastic elements are creating the forces discussed, such as the elastic bands of a speargun, in another emobodiment, the pulling elements are not elastic. In other words, the pulling elements do not stretch significantly along their length when pulled with significant force, and thus the elements are inelastic or almost inelastic. The elasticity of these elements are not critical to the invention, as long as the elements can withstand some degree of force that is desired to be placed on the object onto which the pulling element or elements are inserted (such as power bands of a speargun inserted onto a shaft).

The current invention is highly-compatible with spear-guns in the current art, in that if there is a hole in such a speargun, then elastic 105 elements with attachers 105 can be implemented, wherein the attachers 123 are passed through the hole 103 and attached to a custom made bracket or bracket 125. This allows for an existing speargun to be adapted for the current invention. However in the prior art, the material that makes up the base or stock 101 at the rear of the hole (the region toward the rear 117 of the speargun) often will be curved, so that the elastics 105, when stretched will be pulled against a curved surface. In a preferred embodiment of the current invention, this region is not curved, but flat, as the attacher 123 will not be pulled backwards toward this region, but instead perpendicular to this front/rear axis, so it is generally more desirable for this region to be flat in the current invention.

In addition, as earlier described, the invention is useful for non-speargun apparatus and can be used to increase strength and stability even if there is no separate reason for having elastic elements. Many such uses and embodiments would be apparent to those of ordinary skill in those arts. With regard to the present invention, the many features and advantages of the current invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. An apparatus comprising:
    (a) a stock with a hole in it;
    (b) a first pulling element with a flexible attacher attached at or near a first end of the pulling element;
    (c) a first bracket;
    wherein (a) (b) and (c) are arranged so that the first pulling element is on a first side of the stock, the flexible attacher passes through the hole to a second, opposite side of the stock and around the first bracket on the second side; and (d) a second pulling element with a second flexible attacher at or near a first end of the pulling element and
(e) a second bracket where (d) and (e) are arranged so that (d) is on the second, opposite side of the stock and the second flexible attacher passes through the hole to the first side of the stock and around the second bracket;
wherein the first bracket and the second bracket are part of a same structure.

2. The apparatus of claim 1 wherein each flexible attacher further loops around at least one of the brackets.

3. The apparatus of claim 1 wherein the two pulling elements are connected to each other, at or near the ends opposite the two flexible attachers, by an insertion element.

4. The apparatus of claim 3 wherein the insertion element is capable of being inserted on an object.

5. The apparatus of claim 4 wherein the object is a projectile.

6. The apparatus of claim 5 wherein the object is a spear.

7. The apparatus of claim 1 wherein each pulling element has a tubular shape.

8. The apparatus of claim 1 wherein each pulling element is elastic.

9. The apparatus of claim 1 wherein the apparatus is a speargun.

10. The apparatus of claim 1 wherein the apparatus is a construction element in a permanent or temporary storage or housing structure.

11. An apparatus comprising:
(a) a stock with a hole in it;
(b) a first pulling element with a flexible attacher attached at or near a first end of the pulling element;
(c) a first bracket;
wherein (a) (b) and (c) are arranged so that the first pulling element is on a first side of the stock, the flexible attacher passes through the hole to a second, opposite side of the stock and around the first bracket on the second side; and
(d) a second pulling element with a second flexible attacher at or near a first end of the pulling element and
(e) a second bracket where (d) and (e) are arranged so that (d) is on the second, opposite side of the stock and the second flexible attacher passes through the hole to the first side of the stock and around the second bracket;
wherein the first bracket and the second bracket are not part of a same structure.

12. The apparatus of claim 11 wherein each flexible attacher further loops around at least one of the brackets.

13. The apparatus of claim 11 wherein the two pulling elements are connected to each other, at or near the ends opposite the two attachers, by an insertion element.

14. The apparatus of claim 13 wherein the insertion element is capable of being inserted on an object.

15. The apparatus of claim 14 wherein the object is a projectile.

16. An apparatus comprising:
(a) a stock with a hole in it;
(b) a first element with a flexible attacher attached at or near a first end of the element;
(c) a first bracket;
(d) a second element with a flexible attacher attached at or near a first end of the element; and
(e) a second bracket;
wherein (a) (b) (c) and (d) are arranged so that the first element originates from a first side of the stock and the second element originates from a second side of the stock and each flexible attacher passes through the hole to the opposite side of the stock and around the bracket on the opposite side, so that when tension is placed on each element, each element via the flexible attacher exerts force on the opposite bracket inward toward the stock.

17. The apparatus of claim 16 wherein the apparatus is a speargun.

18. The apparatus of claim 16 wherein the apparatus is a construction element in a permanent or temporary storage or housing structure.

19. The apparatus of claim 16 wherein the first bracket and the second bracket are part of a same structure.

20. The apparatus of claim 16 wherein the first bracket and the second bracket are not part of a same structure.

* * * * *